May 15, 1934. F. H. BERG 1,958,810

STEERING STABILIZER

Filed April 26, 1932

F. H. Berg
INVENTOR

By: Marks & Clerk
ATTYS

UNITED STATES PATENT OFFICE 1,958,810

STEERING STABILIZER

Francis Henry Berg, Balwyn, Victoria, Australia, assignor of one-third to Francis William Stone, Melbourne, Victoria, Australia Application April 26, 1932, Serial No. 607,634
In Australia May 6, 1931

1 Claim. (Cl. 280—90)

My invention relates to means for minimizing jarring of the steering system and wheel wobble in motor vehicles, and its objects are, firstly, to minimize the transmission of road shocks to the steering system, and, secondly, to minimize any tendency of the wheels to develop the lateral oscillation which is known as wheel wobble or shimmer. I attain these objects by the mechanism illustrated in the accompanying drawing in which:—

Figure 1:
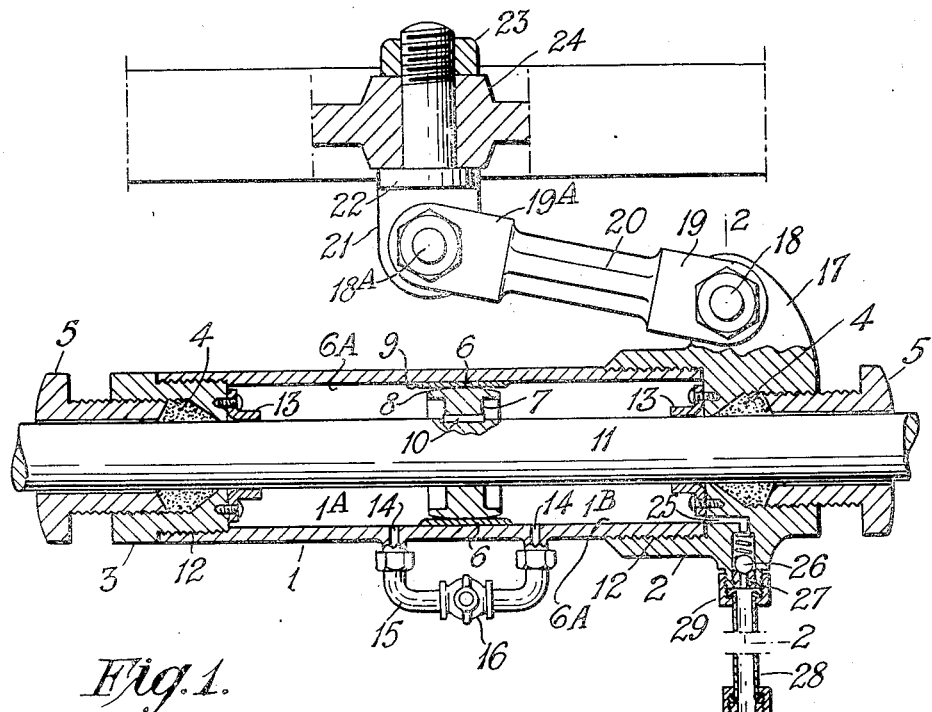
Figure 2:
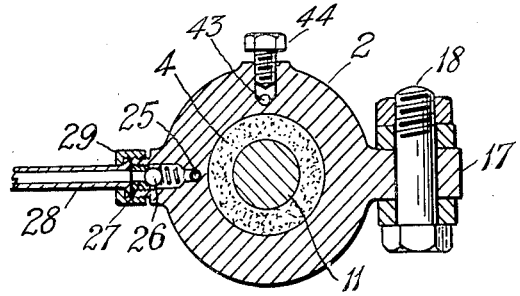
Figure 3:
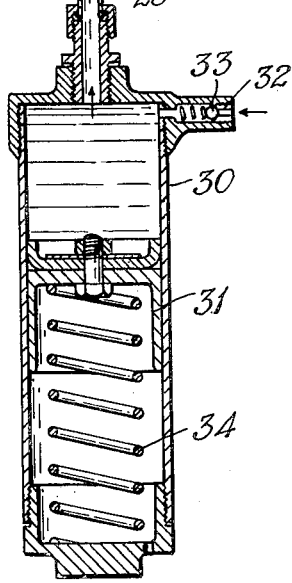
Figure 3:
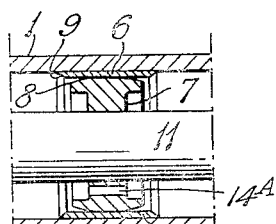
Figure 4:
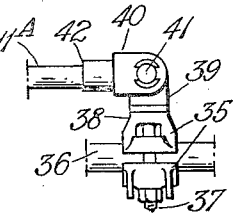

Figure 1 is a sectional plan of the stabilizer;
Figure 2 is a cross-section on the line 2—2 of Figure 1;
Figure 3 is a view of a modified detail, and
Figure 4 is a view of another modified detail.

An hydraulic cylinder 1 is closed by end pieces 2 and 3 which are provided with stuffing boxes 4 and packing nuts 5. The bore of the cylinder is provided with enlargements 6A extending from its ends to a middle unenlarged portion. This may be effected simply by insertion of a liner ring 6 which is expanded to fit tightly into the cylinder. A piston 7 is adapted to slide within the cylinder so as to fit closely against the liner ring 6 and the edges 8 of the piston 7 and the edges 9 of the liner ring 6 are beveled to prevent locking of the piston against the edge of the liner ring. The piston 7 is secured by a feather 10 to a piston-rod 11 which passes right through the end pieces 5 and stuffing boxes 4 of the cylinder. Each end piece is screwed tightly into position, threaded portions 12 being provided for this purpose on the cylinder and end pieces. Each end piece is provided with an hydraulic washer 13. Owing to the insertion of the liner ring 6 the piston fits neatly in the cylinder only on the middle portion of its stroke, so that the remainder of the bore is relatively enlarged. The insertion of the piston divides the chamber of the cylinder into two compartments 1A and 1B, and these are connected by a restricted passageway 14 passing through a pipe 15 which may be provided with a regulating valve 16. If the regulating valve is not desired, a passageway 14A may pass through the piston itself as shown in Figure 3, and the pipe 15 and valve 16 are not then required. The cylinder is filled with liquid, such as oil, under pressure. As the piston rod 11 passes right through the cylinder the effective volume of the cylinder is not altered by any movement of the piston with the exception that oil must pass from one of the compartments 1A, 1B, to the other. As the passageway connecting compartments 1A and 1B is restricted in size any road shock or sudden movement is taken up by the resistance offered by the oil against movement of the piston. The slower movement of steering does not meet with any undue resistance as the oil then passes through the restricted passageway; but when it is desired to turn sharply a freer movement of the steering gear is desirable and for this reason the middle portion of the cylinder is formed of narrower diameter than the rest of the cylinder, so that the piston has relatively free movement once it moves away from its middle position. One of the end pieces 2 is provided with a lug 17 connected by a shackle bolt 18 to a bifurcated end 19 of a short connecting rod 20 the other bifurcated end 19A of which is secured by a shackle bolt 18A to a lug 21 on a bracket 22 which is bolted by a nut 23 to the axle bar 24. To allow air to escape when the cylinder is being filled an air release vent 43, having a closure screw 44, is provided.

To replace oil lost by leakage and maintain pressure in the cylinder, one of the end pieces is provided with an inlet port 25 having a non-return valve 26 and a nipple 27 through which oil may be fed, such as from a grease gun or from the force pump of the lubricating system or to which a flexible feed pipe 28 may be connected by a union 29 so as to provide communication with a cylinder 30 having a piston 31. The cylinder 30 has a filling port 32 containing a non-return valve 33 and the cylinder 30 may thus be filled, to the extent desired, with oil. The piston 31 being pressed forward by a spring 34 forces oil through the pipe 28 and past the non-return valve 26 in the inlet port 25 so as to replace oil lost by leakage. The connecting rod 11 is normally the tie-rod of the steering system so that the above construction may be readily applied to a vehicle in course of construction, but if this is not desired it may be preferred to form the piston rod 11 as a separate rod linked to a moving part of the steering system such as the tie-rod. This may be effected by means illustrated in Figure 4 in which half collars 35 are adapted to be clamped on to the tie-rod 36 by bolts 37 one of these half collars being provided with a boss 38 which is bored and threaded to accommodate a lug-piece 39 which can thus be turned into correct alignment. To this lug-piece a fork 40 is connected by a shackle bolt 41 sufficiently tightly to allow it to be moved pivotally although some force should be required to move it in this way. This fork has a socket piece 42 which engages the end 11A of the piston rod.

I claim:

In steering stabilizing means for minimizing jarring of the steering system and wheel wobble in motor vehicles, the combination of an hydraulic container adapted to be filled with liquid under pressure, with a piston rod passing longitudinally through said container, end closures on said container and stuffing boxes in said end closures through which said piston rod is adapted to pass, a piston attached to said piston rod and thus dividing the inner space of said container into two compartments, a restricted passageway connecting said compartments together, one of said end closures being provided with a passageway the inner end of which communicates with the interior of the hydraulic container, a non-return valve mounted in the outer end of the passageway, an oil supply container, a conducting pipe between the supply container and the passageway in the end closure, means for maintaining the liquid in the supply container under pressure so as to also maintain the liquid in the hydraulic container under continuous pressure, means connecting a relatively stationary portion of said steering stabilizing means to a stationary portion of the vehicle, and means connecting a relatively movable portion of said steering stabilizing means to a moving member of the steering system.

FRANCIS HENRY BERG.